US007016698B2

(12) United States Patent
DeClerck et al.

(10) Patent No.: US 7,016,698 B2
(45) Date of Patent: Mar. 21, 2006

(54) METHOD AND APPARATUS FOR MITIGATING POWER-CONTROL ERRORS DURING A SOFT HANDOFF IN A WIRELESS COMMUNICATION SYSTEM

(75) Inventors: Daniel J. DeClerck, Lake Barrington, IL (US); Dean E. Thorson, Grayslake, IL (US)

(73) Assignee: Motorola, Inc., Schaumburg, IL (US)

( * ) Notice: Subject to any disclaimer, the term of this patent is extended or adjusted under 35 U.S.C. 154(b) by 191 days.

(21) Appl. No.: 10/606,441

(22) Filed: Jun. 26, 2003

(65) Prior Publication Data

US 2004/0266361 A1 Dec. 30, 2004

(51) Int. Cl.
*H04Q 7/20* (2006.01)
*H04B 7/00* (2006.01)

(52) U.S. Cl. ...................... 455/522; 455/442; 455/436; 370/331; 370/333

(58) Field of Classification Search ................ 455/522, 455/500, 436, 442, 438, 422.1, 403, 69; 370/331, 370/333
See application file for complete search history.

(56) References Cited

U.S. PATENT DOCUMENTS

| | | | | |
|---|---|---|---|---|
| 5,640,414 | A | 6/1997 | Blakeney, II et al. | |
| 6,097,972 | A * | 8/2000 | Saints et al. | 455/572 |
| 6,185,199 | B1 | 2/2001 | Zehavi | |
| 6,757,270 | B1 | 6/2004 | Kumar et al. | |
| 2002/0072384 | A1 * | 6/2002 | Chheda | 455/522 |
| 2002/0093918 | A1 | 7/2002 | Kim et al. | |
| 2002/0126739 | A1 | 9/2002 | Tiedemann, Jr. et al. | |
| 2002/0193115 | A1 * | 12/2002 | Furukawa et al. | 455/442 |
| 2004/0038698 | A1 * | 2/2004 | Muller et al. | 455/522 |
| 2004/0180687 | A1 * | 9/2004 | Ahn et al. | 455/522 |
| 2004/0203782 | A1 * | 10/2004 | Peng et al. | 455/436 |

* cited by examiner

*Primary Examiner*—Edan Orgad
(74) *Attorney, Agent, or Firm*—Simon B. Anolick

(57) ABSTRACT

A plurality of base stations (600) are programmed (702) with a uniform power-control bit pattern to be sent to a mobile unit during a plurality of power-control bit times, before the mobile unit is acquired on a reverse link. The plurality of base stations are further arranged and programmed to synchronize (704) transmissions of the uniform power-control bit pattern such that the plurality of base stations, when transmitting, send identical power-control bits during each of the plurality of power-control bit times.

12 Claims, 2 Drawing Sheets

-PRIOR ART-

-PRIOR ART-

METHOD AND APPARATUS FOR MITIGATING POWER-CONTROL ERRORS DURING A SOFT HANDOFF IN A WIRELESS COMMUNICATION SYSTEM

FIELD OF THE INVENTION

This invention relates in general to wireless communication systems, and more specifically to a method and apparatus for mitigating power-control errors during a soft handoff in a wireless communication system.

BACKGROUND OF THE INVENTION

Prior-art wireless communication systems have employed a special "slow-power-up" power control technique to prevent power spikes on the reverse channel from the mobile unit to the base station during the initiation of a call and during a handoff. Recently, "soft" handoffs have become increasingly popular, because of the advantages they can provide. In a soft handoff, the mobile unit initially monitors more than one base station simultaneously in order to facilitate a handoff to the base station that can provide the best signal quality.

Unfortunately, monitoring more than one prior-art base station can result in conflicting power-control information being sent to the mobile unit, sometimes causing the mobile unit to decrease power when, in fact, all the monitored base stations are signaling the mobile unit to increase power!

Thus, what is needed is a method and apparatus for mitigating power-control errors during a soft handoff in a wireless communication system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF THE PREFERRED EMBODIMENTS

In overview, the present disclosure concerns wireless communication systems that provide service for communications units or more specifically a user thereof operating therein. More particularly, various inventive concepts and principles embodied as a method and apparatus for mitigating power-control errors during a soft handoff in a wireless communication system for use in equipment with such communications systems will be discussed and disclosed. The communications systems of particular interest are those being deployed and developed such as CDMA (Code Division Multiple Access), W-CDMA (Wideband-CDMA), CDMA2000, 2.5G (Generation), 3G, UMTS (Universal Mobile Telecommunications Services) systems and evolutions thereof that utilize spread spectrum signals, although the concepts and principles have application in other systems and devices as well.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in one or more conventional processors, or with integrated circuits (ICs) such as custom or application specific ICs. It is expected that one of ordinary skill, notwithstanding possibly significant effort and many design choices motivated by, for example, available time, current technology, and economic considerations, when guided by the concepts and principles disclosed herein will be readily capable of programming such processors, or generating such ICs with minimal experimentation. Therefore, in the interest of brevity and minimization of any risk of obscuring the principles and concepts according to the present invention, further discussion of such processors and ICs, if any, will be limited to the essentials with respect to the principles and concepts employed by the preferred embodiments.

Figure 1:
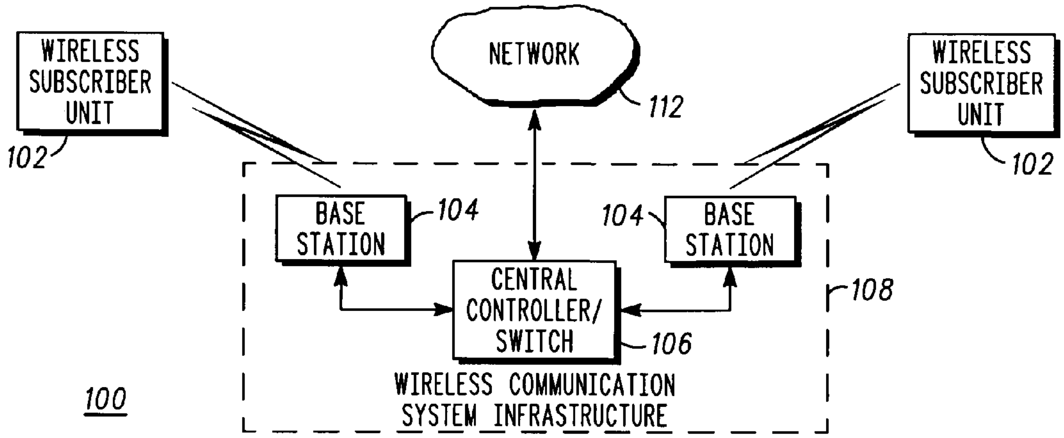
FIG. 1 is an electrical block diagram of a prior-art wireless communication system.

Referring to FIG. 1, an electrical block diagram of a prior-art wireless communication system 100 comprises a wireless communication system infrastructure 108, coupled wirelessly to a plurality of wireless subscriber units 102, also herein referred to as "mobile units" 102. The wireless communication system infrastructure 108 comprises a plurality of base stations 104 coupled to a central controller/switch 106 for controlling the infrastructure 108 and for switching calls within the infrastructure 108 and between the infrastructure 108 and a network 112, such as the public switched telephone network. The communication system 100 including the wireless subscriber or communication units is a conventional system such as a CDMA system with corresponding subscriber handsets.

Figure 2:
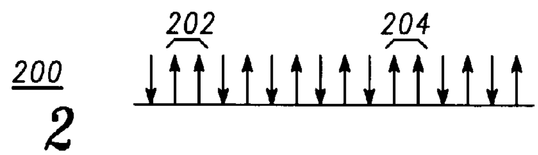
FIG. 2 is a diagram depicting an exemplary power-control bit sequence.

Referring to FIG. 2, a diagram depicts an exemplary power-control-bit sequence 200 that can be utilized to control the power of a mobile unit in a wireless communication system, such as a code division multiple access (CDMA) system, or any other system that can benefit from mobile power control. The horizontal axis represents time. The power-control bit sequence 200 preferably is sent on a forward link by one or more base stations 104 to the mobile unit 102 in response to an origination request received from the mobile unit 102. In the prior-art system 100, the power-control bit sequence 200 is usually a "slow-power-up" sequence, which includes mostly alternating "power-up" bits (represented in FIG. 2 by up arrows) and "power-down" bits (represented by down arrows), with an occasional extra power-up bit. The exemplary power-control bit sequence 200 comprises two pairs 202, 204 of consecutive power-up bits, with the remainder of the bits alternating, for a total of nine power-up commands and seven power-down commands per frame of sixteen power-control bits. Such a sequence is intended to gradually increase the power of the mobile unit 102 to prevent a power "spike" from occurring before the base station 104 has acquired the mobile unit 102 on a reverse link and established a closed-loop power control.

It is worth noting that, in the prior-art system 100, the exact structure of the power-control bit sequence can be selected by the system operator. For example, one system operator may choose to use a power-control bit sequence exactly like the exemplary power-control bit sequence 200, while another system operator may choose to move the two pairs 202, 204 of consecutive power-up bits to a different location in the frame, while yet another system operator may choose a faster power-up sequence that uses two pairs of three consecutive power-up bits, and so on. Further complicating the issue, some systems use a power-control bit sequence that is longer than one frame, and thus does not repeat in every frame. These differences can cause operational difficulties during soft handoff, as will be explained next.

Figure 3:
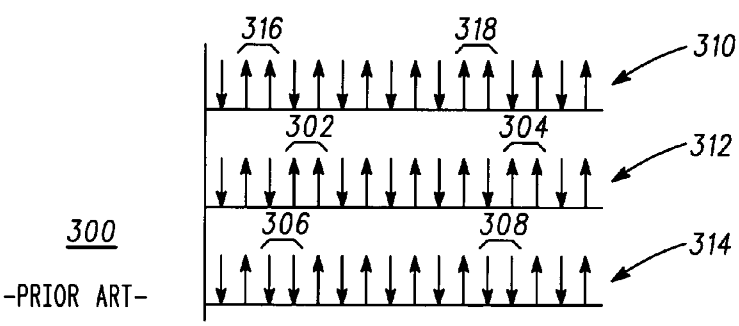
FIG. 3 is a diagram depicting power-control errors that can occur during soft handoff in the prior-art wireless communication system.

Referring to FIG. 3, a diagram 300 depicting power-control errors that can occur during soft handoff in the prior-art wireless communication system 100 comprises a first power-control bit sequence 310 including two pairs 316, 318 of consecutive power-up bits sent by a first base station attempting to communicate with the mobile unit 102. The diagram 300 further comprises a second power-control bit sequence 312 including two pairs 302, 304 of consecutive power-up bits sent by a second base station attempting to communicate with the mobile unit 102. Note that the two pairs 316, 318 are offset in time from the two pairs 302, 304. The power-control bit sequence 314 depicts how the mobile unit 102 will resolve the first and second power-control bit sequences 310, 312. When the mobile unit 102 simultaneously receives two conflicting power-control bits (one up and one down), the protocol rules typically require the mobile unit to resolve the conflicting bits as a power-down bit. The power-control bit sequence 314 resolved by the mobile unit 102 thus includes two pairs 306, 308 of consecutive power-down bits. The mobile unit 102 disadvantageously will gradually reduce its transmitted power, even though both base stations 104 are requesting the mobile unit 102 to gradually increase its transmitted power! The end result of this unfortunate behavior is that the base station is unlikely to ever acquire the mobile station on the reverse link, resulting in a system failure and at some point a disappointed user.

Figure 4:
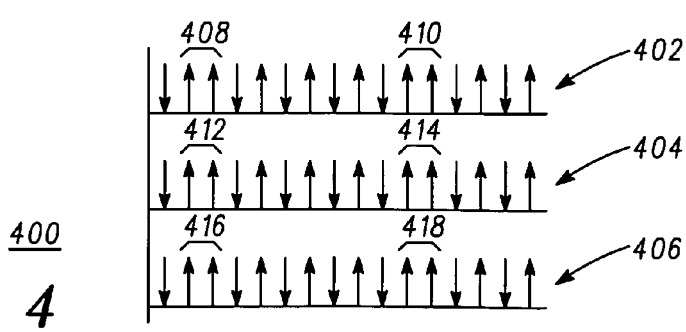
FIG. 4 is a diagram depicting a technique for mitigating power-control errors during soft handoff in accordance with a first embodiment of the present invention.

Referring to FIG. 4, a diagram 400 depicting a technique for mitigating power-control errors during soft handoff in accordance with a first embodiment of the present invention comprises first and second uniform power-control bit sequences 402, 404 sent from first and second base stations during a plurality of power-control bit times (represented by the position of the arrows along the horizontal axis). Note that the first and second uniform power-control bit sequences 402, 404 are identical to one another. The transmissions of the first and second uniform power-control bit sequences 402, 404 are timed such that the first and second base stations send identical power-control bits during each of the plurality of power-control bit times. Note that first and second pairs 408, 410 of consecutive power-up bits of the first uniform power-control bit sequence 402 occur simultaneously with the first and second pairs 412, 414 of consecutive power-up bits of the second uniform power-control bit sequence 404. Note further that the power-control bit sequence 406 resolved by the mobile unit 102 correctly includes two pairs 416, 418 of consecutive power-up bits. Thus the mobile unit 102 advantageously and appropriately controls the output power level in accordance with the power-control bit sequence provided by each base station, and acquisition of the mobile unit is likely to occur.

Figure 5:
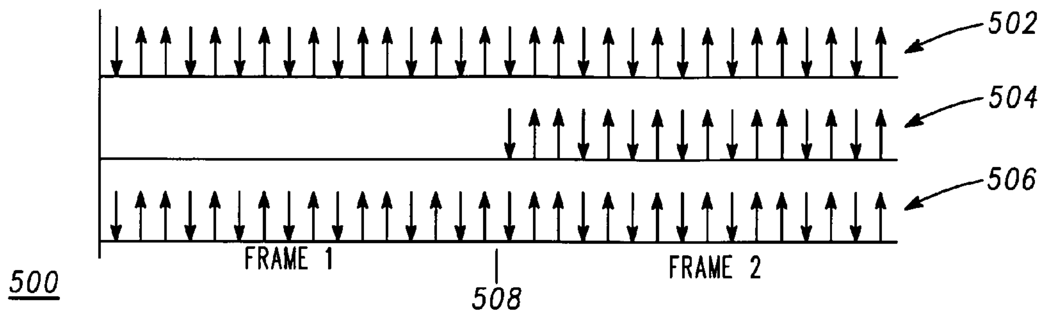
FIG. 5 is a diagram depicting a technique for mitigating power-control errors during soft handoff in accordance with a second embodiment of the present invention.

Referring to FIG. 5, a diagram 500 depicting a technique for mitigating power-control errors during soft handoff in accordance with a second embodiment of the present invention comprises a first power-control bit sequence 502 transmitted by a first base station, and a second power-control bit sequence 504 transmitted by a second base station. Note that the bit pattern repeats every frame. Thus, it is possible for the first base station to start its transmission of the first power-control sequence 502 at the start of the first frame, and for the second base station to begin its transmission of the second power-control bit sequence 504 at the start 508 of the second frame. Note that the power-control bit sequence 506, as resolved by the mobile unit, is correct and is unaffected by the late start of the second power-control bit sequence 504.

It will be appreciated that, in yet another embodiment, a power-control bit sequence can require more than a single transmission frame of the forward link from the base station to the mobile unit before the pattern repeats. In that embodiment, timing the transmissions comprises synchronizing the transmissions from each of the base stations attempting to communicate with the mobile unit such that the transmissions start at substantially identical times.

Figure 6:
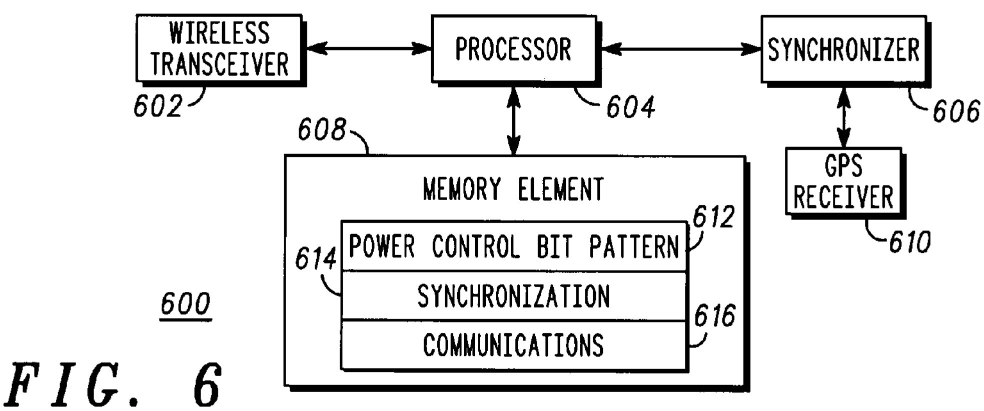
FIG. 6 is an electrical block diagram of an exemplary base station in accordance with the present invention.

Referring to FIG. 6, an electrical block diagram of an exemplary base station 600 in accordance with the present invention comprises a conventional processor 604, e.g., a processor of the MC68000 family available from Motorola, Inc., for controlling the base station 600, and a conventional wireless transceiver 602, such as the wireless transceiver employed in CDMA base stations available from Motorola, Inc. and others, coupled to the processor 604 for providing wireless communications for the base station 600. The base station 600 further comprises a synchronizer 606 coupled to the processor 604 for cooperating with the processor 604 through well-known techniques to time transmissions of a uniform power-control bit pattern such that a plurality of base stations, when transmitting, send identical power-control bits during each of the plurality of power-control bit times. The synchronizer 606 preferably is coupled to a conventional global positioning system (GPS) receiver 610 for receiving a timing signal therefrom. It will be appreciated that, alternatively, another type of synchronization system can be utilized instead of GPS, such as LORAN-C, the Network Time Protocol, or other timing systems. It will be further appreciated that, in some embodiments, the synchronizer 606 can be incorporated into the processor 604 instead.

In addition, the base station 600 includes a memory element 608 coupled to the processor 604 for storing software instructions for programming or for execution by the processor 604 in accordance with the present invention. The memory element 608 comprises a uniform power-control bit pattern 612 to be sent by different ones of a plurality of base stations to the mobile unit during a plurality of power-control bit times, before the mobile unit is acquired on a reverse link. The memory element 608 also includes a synchronization program 614 for programming the processor 604 to cooperate with the synchronizer 606 to synchronize the transmissions. In addition, the memory element 608 includes a conventional communications program 616 for programming the processor 604 to control the communications of the base station 600 in accordance with the protocol employed by the base station 600.

Figure 7:
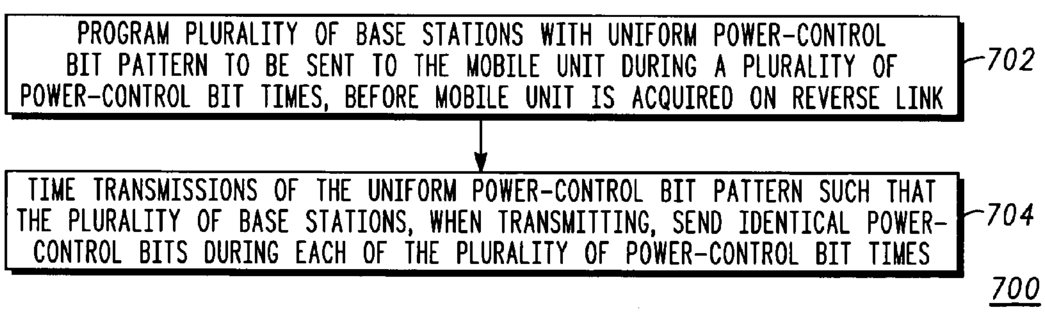
FIG. 7 is a flow diagram of an exemplary method in accordance with the present invention.

Referring to FIG. 7, a flow diagram 700 of an exemplary method in accordance with the present invention begins with programming 702 a plurality of base stations with a uniform power-control bit pattern to be sent to the mobile unit during a plurality of power-control bit times, before the mobile unit is acquired on a reverse link. Next, the base stations time 704 their respective transmissions of the uniform power-control bit pattern such that the plurality of base stations, when transmitting, send identical power-control bits during each of the plurality of power-control bit times. Timing the transmissions preferably comprises synchronizing the transmissions through a synchronization signal made available to the plurality of base stations.

In one embodiment, programming the plurality of base stations with the uniform power-control bit pattern comprises programming a pattern that requires more than a single transmission frame of a forward link from a base station to the mobile unit before the pattern repeats. In that embodiment, timing the transmissions comprises synchronizing the transmissions from each of the plurality of base stations such that the transmissions start at substantially identical times.

In another embodiment, programming the plurality of base stations with the uniform power-control bit pattern comprises programming a pattern that repeats after a single one of a plurality of transmission frames of a forward link from the base station to the mobile unit, and timing the transmissions comprises starting the transmissions at substantially identical points within different ones of the plurality of transmission frames.

In yet another embodiment, programming the plurality of base stations with the uniform power-control bit pattern comprises programming a pattern that repeats after a single one of a plurality of transmission frames of a forward link from the base station to the mobile unit, and timing the transmissions comprises starting the transmissions at substantially identical points within a specific one of the plurality of transmission frames.

Figure 8:
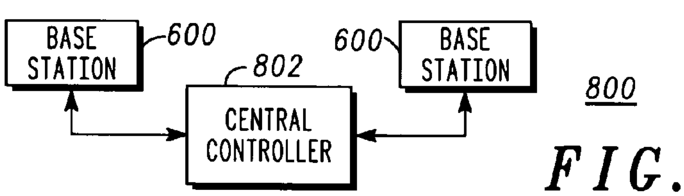
FIG. 8 is an electrical block diagram of an exemplary communication system infrastructure in accordance with the present invention.

Referring to FIG. 8, an electrical block diagram of an exemplary communication system infrastructure 800 in accordance with the present invention comprises a central controller 802 for controlling the communication system infrastructure 800, and a plurality of the base stations 600 coupled to the central controller 802 for handling communications of the infrastructure 800. It will be appreciated that the central controller 802 can also comprise a switch (not shown) for switching communications present in the infrastructure 800.

Thus, it should be clear from the preceding disclosure that the present invention provides a method and apparatus for mitigating power-control errors during a soft handoff in a wireless communication system. The method and apparatus advantageously is simple to implement in the base stations.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method in a wireless communication system for mitigating power-control errors during a soft handoff of a mobile unit, the method comprising:

programming a plurality of base stations with a uniform power-control bit pattern to be sent to the mobile unit during a plurality of power-control bit times, before the mobile unit is acquired on a reverse link; and timing transmissions of the uniform power-control bit pattern such that the plurality of base stations, when transmitting, send identical power-control bits during each of the plurality of power-control bit times, and wherein programming the plurality of base stations with the uniform power-control bit pattern comprises programming a pattern that requires more than a single transmission frame of a forward link from a base station to the mobile unit before the pattern repeats, and wherein timing the transmissions comprises synchronizing the transmissions from each of the plurality of base stations such that the transmissions start at substantially identical times.

2. The method of claim 1, wherein programming the plurality of base stations with the uniform power-control bit pattern comprises programming a pattern that repeats after a single one of a plurality of transmission frames of a forward link from the base station to the mobile unit, and wherein timing the transmissions comprises starting the transmissions at substantially identical points within different ones of the plurality of transmission frames.

3. The method of claim 1, wherein programming the plurality of base stations with the uniform power-control bit pattern comprises programming a pattern that repeats after a single one of a plurality of transmission frames of a forward link from the base station to the mobile unit, and wherein timing the transmissions comprises starting the transmissions at substantially identical points within a specific one of the plurality of transmission frames.

4. An apparatus for use in a wireless communication system for mitigating power-control errors during a soft handoff of a mobile unit, the apparatus for use with a base station of a plurality of base stations attempting to communicate with the mobile unit, the apparatus comprising:

a processor for controlling the base station;

a memory element coupled to the processor for programming the processor, the memory element comprising a uniform power-control bit pattern to be sent by different ones of the plurality of base stations to the mobile unit during a plurality of power-control bit times, before the mobile unit is acquired on a reverse link; and a synchronizer coupled to the processor for cooperating with the processor to time transmissions of the uniform power-control bit pattern such that the plurality of base stations, when transmitting, send identical power-control bits during each of the plurality of power-control bit times, and wherein the uniform power-control bit pattern is a pattern that requires more than a single transmission frame of a forward link from the base station to the mobile unit before the pattern repeats, and wherein the synchronizer is arranged and programmed such that the transmissions of the uniform power-control bit pattern from the plurality of base stations start at substantially identical times.

5. The apparatus of claim 4, wherein the uniform power-control bit pattern is a pattern that repeats after a single one of a plurality of transmission frames of a forward link from the base station to the mobile unit, and wherein the synchronizer is arranged and programmed such that the transmissions of the uniform power-control bit pattern from the plurality of base stations start at substantially identical points within different ones of the plurality of transmission frames.

6. The apparatus of claim 4, wherein the uniform power-control bit pattern is a pattern that repeats after a single one of a plurality of transmission frames of a forward link from the base station to the mobile unit, and wherein the synchronizer is arranged and programmed such that the transmissions of the uniform power-control bit pattern from the plurality of base stations start at a substantially identical point within a specific one of the plurality of transmission frames.

7. A base station for use in a wireless communication system for mitigating power-control errors during a soft handoff of a mobile unit, the base station being one of a plurality of base stations attempting to communicate with the mobile unit, the base station comprising:

a processor for controlling the base station;

a wireless transceiver coupled to the processor for providing wireless communications for the base station;

a memory element coupled to the processor for programming the processor, the memory element comprising a uniform power-control bit pattern to be sent by different ones of the plurality of base stations to the mobile unit during a plurality of power-control bit times, before the mobile unit is acquired on a reverse link; and a synchronizer coupled to the processor for cooperating with the processor to time transmissions of the uniform power-control bit pattern such that the plurality of base stations, when transmitting, send identical power-control bits during each of the plurality of power-control bit times, and wherein the uniform power-control bit pattern is a pattern that requires more than a single transmission frame of a forward link from the base station to the mobile unit before the pattern repeats, and wherein the synchronizer is arranged and programmed such that the transmissions of the uniform power-control bit pattern from the plurality of base stations start at substantially identical times.

8. The base station of claim 7, wherein the uniform power-control bit pattern is a pattern that repeats after a single one of a plurality of transmission frames of a forward link from the base station to the mobile unit, and wherein the synchronizer is arranged and programmed such that the transmissions of the uniform power-control bit pattern from the plurality of base stations start at substantially identical points within different ones of the plurality of transmission frames.

9. The base station of claim 7, wherein the uniform power-control bit pattern is a pattern that repeats after a single one of a plurality of transmission frames of a forward link from the base station to the mobile unit, and wherein the synchronizer is arranged and programmed such that the transmissions of the uniform power-control bit pattern from the plurality of base stations start at a substantially identical point within a specific one of the plurality of transmission frames.

10. A wireless communication system infrastructure for mitigating power-control errors during a soft handoff of a mobile unit, the infrastructure comprising:

a central controller for controlling the communication system infrastructure; and a plurality of base stations coupled to the central controller for handling communications of the infrastructure, wherein a base station of the plurality of base stations comprises:

a processor for controlling the base station;

a wireless transceiver coupled to the processor for providing wireless communications for the base station;

a memory element coupled to the processor for programming the processor, the memory element comprising a uniform power-control bit pattern to be sent by different ones of the plurality of base stations to the mobile unit during a plurality of power-control bit times, before the mobile unit is acquired on a reverse link; and a synchronizer coupled to the processor for cooperating with the processor to time transmissions of the uniform power-control bit pattern such that the plurality of base stations, when transmitting, send identical power-control bits during each of the plurality of power-control bit times.

wherein the uniform power-control bit pattern is a pattern that requires more than a single transmission frame of a forward link from the base station to the mobile unit before the pattern repeats, and wherein the synchronizer is arranged and programmed such that the transmissions of the uniform power-control bit pattern from the plurality of base stations start at substantially identical times.

11. The infrastructure of claim 10, wherein the uniform power-control bit pattern is a pattern that repeats after a single one of a plurality of transmission frames of a forward link from the base station to the mobile unit, and wherein the synchronizer is arranged and programmed such that the transmissions of the uniform power-control bit pattern from the plurality of base stations start at substantially identical points within different ones of the plurality of transmission frames.

12. The infrastructure of claim 10, wherein the uniform power-control bit pattern is a pattern that repeats after a single one of a plurality of transmission frames of a forward link from the base station to the mobile unit, and wherein the synchronizer is arranged and programmed such that the transmissions of the uniform power-control bit pattern from the plurality of base stations start at a substantially identical point within a specific one of the plurality of transmission frames.

* * * * *